United States Patent [19]
Bergmeister et al.

[11] 3,720,538
[45] March 13, 1973

[54] METHOD OF PROTECTING MATERIALS AGAINST WATER ABSORPTION

[75] Inventors: Eduard Bergmeister; Paul-Gerhard Kirst; Siegfried Nitzsche; Ewald Pirson; Michael Roth, all of Burghausen/Obb., Germany

[73] Assignee: Wacker Chemie GmbH, Munich, Germany

[22] Filed: Dec. 14, 1970

[21] Appl. No.: 98,189

Related U.S. Application Data

[62] Division of Ser. No. 739,662, June 25, 1968, abandoned.

[30] Foreign Application Priority Data

June 30, 1967 Germany..................W 44,287

[52] U.S. Cl. ...........117/72, 117/123 D, 117/161 ZA
[51] Int. Cl.........................B32b 13/12, B44d 1/14
[58] Field of Search .117/72, 123 D, 132 BS, 161 ZA

[56] References Cited

UNITED STATES PATENTS

| 3,459,690 | 8/1969 | Baugh et al. ...................117/160 R X |
| 3,261,881 | 7/1966 | Christenson et al. ..............260/827 X |
| 2,679,491 | 5/1954 | Kennedy et al. ...............117/123 D X |
| 3,234,039 | 2/1966 | Lalk et al. ..............................117/72 |
| 3,037,881 | 6/1962 | McDowell .....................117/123 D X |
| 3,415,674 | 12/1968 | Voisenet ................................117/72 |
| 2,973,287 | 2/1961 | McBride..........................260/826 X |
| 2,927,910 | 3/1960 | Cooper............................260/826 X |
| 3,294,709 | 12/1966 | Nitzsche ..................117/123 D X |

FOREIGN PATENTS OR APPLICATIONS 801,529 9/1958 Great Britain.......................260/827

Primary Examiner—Ralph Husack
Attorney—Hammond & Littell

[57] ABSTRACT

A mixture of 20 to 99% by weight of an organic synthetic resin and 1 to 80% by weight of an organopolysiloxane having the average formula $$R_x Si(OR')_y (CH)_2 O_{4-x-y-z/2}$$

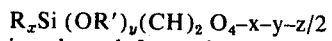

wherein R is selected from the group consisting of hydrogen methyl and at least 50 percent of the R's being methyl, R' is alkyl of one to four carbon atoms, $x$, $y$ and $z$ are 0, 1, 2 or 3 with the sum of $x + y + z$ being not greater than 3, the average value of $y$ and being 0.9 to 1.7 and the average value of $x$ and $z$ being 0.00 to 0.10 with at least one of the average values for $z$ and $y$ being other than 0.00, said mixture being dissolved in an organic solvent, which is useful for forming a prime coat on construction materials.

9 Claims, No Drawings

METHOD OF PROTECTING MATERIALS AGAINST WATER ABSORPTION

PRIOR APPLICATION

This application is a divisional application of U.S. Pat. application Ser. No. 739,662, filed June 25, 1968 and now abandoned.

PRIOR ART

Prime or base coats are frequently applied to interior or exterior construction materials before applying the final coat based on an aqueous polymer dispersion paint. The known prime coat compositions for this purpose have been based on polymer dispersions greatly diluted with water. Prime coat compositions based on priming agents dissolved in organic solvents or solutions of polymers contained in such priming agents have the disadvantage that after the formation of the cracks or "crazes" in the construction material and/or the final coating, water easily soaks through to the building material underneath which leads to scaling off or peeling of the coating.

OBJECTS OF THE INVENTION

It is an object of the invention to provide a novel composition for primary building materials, particularly concrete.

It is another object of the invention to provide an improved method of providing building materials with a protective coating.

These and other objects and advantages of the invention will become obvious from the following detailed description.

THE INVENTION

The prime coating compositions of the invention are comprised of a solution of a mixture of (1) 20 to 99 percent by weight of at least one organic synthetic resin and (2) 1 to 80 percent by weight of an organo polysiloxane having units of the average formula

$$R_x Si(OR')_y (OH)_z O_{4-x-y-z/2} \quad I$$

wherein R is selected from the group consisting of hydrogen and methyl with at least 50 percent of the total Rs being methyl, R' is alkyl of one to four carbon atoms, $x$, $y$ and $z$ being 0, 1, 2 or 3 with the sum of $x+y+z$ being not greater than 3, with the average value of $x$ being 0.9 to 1.7 and the average value of $z$ and $y$ being 0.00 to 0.10 and at least one of $z$ and $y$ being greater than 0.00 in an organic solvent. Particularly preferred are solutions containing as solids 50 to 90 percent by weight of the organic resin and 10 to 50 percent by weight of the organopolysiloxane for optimum adhesion of the final coat and lowest water absorption.

The prime coating compositions of the invention lack the disadvantages of the prior art prime coats and protect construction materials against water absorption by impregnating the construction material with the said composition to form a waterproof coat even though cracks or crazes occur in the construction material and/or in the top or final coating. Moreover, there is good adhesion between the hardened prime coat and the aqueous polymer dispersion topcoat. The advantages of these prime coat compositions despite high concentrations of organopolysiloxanes was surprising since organopolysiloxanes have a repelling effect. (Noll, Chemie und Technologie der Silicone, Weinheim, 1960, p. 356) and prime coat compositions by their very nature should not show these effects or the top coat would not adhere to them.

As suitable organic solvents for the prime coat compositions of the invention are any organic solvent liquid at 0° to 20° C and 760 mm Hg (abs) in which the organopoly-siloxanes and synthetic resins are soluble at 5 parts by weight at room temperature and which are inert to the said polyorganosiloxanes and resins. Preferably the boiling point of the solvent is not more than 250° C. Specific examples of suitable solvents are hydrocarbons such as alkanes having a boiling point of 120° to 180°C, toluene, xylene, trimethylbenzenes; halogenated hydrocarbons, such as trichloroethylene; alcohols such as lower alkanols isopropyl alcohol, diacetone alcohol; carboxylic acid esters such as ethyl acetate, etc.

To insure a good penetration of the prime coat composition into the construction material even at high atmospheric temperatures, it is preferred to use a solvent which evaporates at a rate at least 10 times slower than ethyl ether. For a good penetration into wet materials, it is preferable to use a solvent at least part of which is water-miscible such as isopropyl alcohol or diacetone alcohol.

The total amount of solids in the organic solution is preferably between 5 and 30 percent by weight of the total solution. The preferred amount of solid content increases with an increase in the absorption rate of the particular construction materials to be primed.

In the organopolysiloxanes of formula I, R' may be methyl, ethyl, n-propyl, isopropyl, n-butyl, isobutyl, secondary butyl or tertiary butyl, but ethyl is preferred since these organopolysiloxanes are commercially available. Moreover, the organopolysiloxanes in which $x$ is 1.0 to 1.2 are preferred again due to commercial availability. Preferably, the organopolysiloxanes used in the compositions of the invention contain not more than 30 mole percent of siloxane units with more than one Si-methyl group and they preferably have a viscosity not greater than 100 OcSt/25°C in a 50 percent by weight toluene solution. If the organopolysiloxanes contain Si-OH groups, the organopolysiloxanes can be copolymers of siloxane units free from Si-bound hydrogen and units containing Si-bound hydrogen. In the case of Si-bound hydrogen presence, the organopolysiloxanes are preferably mixtures of Si-bound hydrogen and free of Si-bound hydrogen. An example of such a mixture is a mixture consisting of 80 parts by weight of a liquid organopolysiloxane of 20 mole per cent of dimethylsiloxane units and 80 mole percent of monomethylsiloxane units and 20 parts by weight of a methyl hydrogen polysiloxane having a viscosity of 25 cSt/25°C. The preparation of the said organopolysiloxanes are well known and are commercially available.

The organic synthetic resins used in the compositions of the invention contain hydrogen and carbon and optionally oxygen, sulfur, nitrogen and/or halogens. They may be prepared by polymerization, polycondensation or polyaddition and are well known and commercially available. Examples of said resins are vinyl-, vinylidene- or acryl resins, alkyd resins, epoxy resins, polyester resins, polyether resins, polyamide resins, etc. The organic synthetic resins can be made of different types of polymer units which may be dispersed at random or in blocks in the resin molecule.

Preferred synthetic resins are prepared from polymerization of a monomer having at least one double bond and water insoluble resins prepared from such polymers. Examples of monomers or mixtures of monomers for such synthetic resins are vinyl esters such as vinyl acetate, vinylpropionate, vinyl chloroacetate, vinyl laurate and vinyl stearate; vinyl or vinylidene halides such as vinyl chloride, vinylidene chloride; styrene and its derivatives such as vinyl toluene, α-methyl styrene; olefins such as ethylene, propylene, isobutylene, butadiene; vinyl ethers such as vinyl ethyl ether; acrylonitrile; acrylic acid and methacrylic acid esters such as methyl acrylate, ethyl acrylate, methyl methacrylate; butyl acrylate; unsaturated dicarboxylic acids such as maleic acid, fumaric acid, methylenemalonic acid, itaconic acid, citraconic acid, tetrahydrophthalic acid; mono and di-esters of said dicarboxylic acid such as dimethyl maleate, diethyl maleate, di-n-butyl maleate, mono 2-ethylhexyl maleate, dimethylfumarate, diethyl fumarate, di-n-butyl fumarate, di-2-ethylhexyl fumarate, dilauryl fumarate, etc. A most important group of water insoluble resins are those prepared from polymers of polyvinyl acetals such as polyvinylformal, polyvinylbutyral and polyvinyl-n-hexanalacetate and the preferred resins are vinyl resins, particularly polymers and copolymers of vinyl esters.

The prime coating compositions of the invention may be applied to the building materials in any known fashion such as spraying, painting with brush or roller, dipping, etc. The said compositions are applied at a rate of 300 to 700 gm of the organopolysiloxane and synthetic resin per square meter of surface to be coated. The said coating compositions may optionally contain additives such as pigments, hardening agents for the organopolysiloxanes and/or plasticizers although these are not usually needed.

The construction materials to be coated with the prime coat compositions of the invention before top coating with an aqueous polymer dispersion may be used for exterior or interior purposes. The said materials are preferably inorganic such as wall and roofing tiles, bricks, natural rocks, hydraulically or non-hydraulically set materials such as concrete, limestone, asbestos cement, masonry, gypsum coated with a mortar of lime and sand, etc.

The compositions to be used for the top coat may be any known aqueous polymer dispersion paint or water base latex paint which up to now have been used for the protective coating of construction materials. The top or final coatings do not necessarily serve as a protective coating but may also serve esthetic and decorative purposes. Examples of suitable aqueous polymer dispersions which are useful as top coats for construction materials are aqueous dispersions of polymers of vinylacetate, vinyl propionate, methyl methacrylate, ethyl acrylate, vinyl chloride; copolymers of any two or more of said monomers; copolymers of one or more of said monomers with di-n-butyl maleinate or di-n-butyl fumarate; copolymers of butadiene-styrene or butadiene-styrene-acrylic acid.

The said aqueous dispersion compositions usually contain other additives such as pigments, protective colloids, softeners, anti-foaming agents, fungicides, etc., if used as protective coatings. They are usually called "dispersion paints" and are commercially available.

The surfaces to be coated with the prime coating compositions such as the exterior of buildings preferably do not receive a second prime coating of a dispersion paint before application of the top or final coat since the second prime coat increases cost and is unnecessary.

In the following examples, there are described several preferred embodiments to illustrate the invention. However, it should be understood that the invention is not intended to be limited to the specific embodiment.

EXAMPLE I

A solution of 89.6 parts by weight of toluene containing 7 parts by weight of a mixed polymer of 80 percent by weight of vinyl acetate and 20 percent by weight of vinyl laurate having a K value of 43 [Cellulose Chemie, Vol. 13 (1932), p. 58], and 3.4 parts by weight of an organopolysiloxane consisting primarily of monomethylsiloxane units and a minor amount of dimethylsiloxane units and having an average formula $$(CH_3)_{1.10}Si(OC_2H_5)_{0.02}(OH)_{0.04}O_{2.84/2}$$

and a viscosity in a 50 percent by weight toluene solution of 40 to 60 cSt/25°C (DIN beaker with 4 mm opening for 12 seconds) was brushed onto a slab of porous concrete having a raw weight unit of 550 to 700 $Kg^2/m^3$ at a rate of 630 $gm/m^2$. The raw weight unit is the quotient of weight of concrete divided by its volume including pores and hollow spaces. This was called Slab A.

For comparison purposes, Slab B was prepared in the same fashion using as the coating solution 10 parts by weight of a mixed polymer consisting of 80 percent by weight of vinyl acetate and 20 percent by weight of vinyl laurate having a K-value of 43 dissolved in 90 parts by weight of toluene.

Slab C was prepared in the same way using 3.4 parts by weight of the foregoing organopolysiloxane in 96.6 parts by weight of toluene as the coating agent.

Only one half of each of the concrete slabs were coated, and after standing for 24 hours, the slabs were brush-coated with a dispersion paint prepared as below over their primed surface. Slabs A and B were coated without difficulty but the primed porous concrete of Slab C was insufficiently wetted and the top coat developed "fish-eyes" or specks due to spreading disturbances.

0.5 ml of water was applied dropwise to the portion of porous concrete of the slabs which had received the priming coat but not the top coat to determine the water absorption. The absorption time or time it took for the droplets to disappear was determined and the results are shown in Table I.

TABLE I

| Slab | Time in Sec. |
|---|---|
| A | > 27,000 |
| B | 60 |
| C | > 27,000 |
| Unprimed | 7 |

The dispersion paint was prepared as follows: 150 parts by weight of water, 2 parts by weight of a 10 percent solution of p-chloro-m-creosol in toluene, 10 parts by weight of a 10 percent aqueous solution of potassium hexametaphosphate, 11 parts by weight of ethylene glycol, 2 parts by weight of tributyl phosphate, 20 parts by weight of 2-ethylhexyl acetate, 1 part by weight of ammonium polyacrylate, 170 parts by weight of titanium dioxide (rutile), 30 parts by weight of talc, 25 parts by weight of chalk, 40 parts by weight of kaolin, 375 parts by weight of a 50 percent aqueous dispersion of polyvinyl propionate and 164 parts by weight of a 2 percent aqueous solution of hydroxymethylcellulose were admixed and the pH value was adjusted to 8 with ammonia. The said admixture was diluted with 10 percent by weight of water based on the total mixture before application.

EXAMPLE II

A solution of 5 parts by weight of an organopolysiloxane having the average formula $$(CH_3)_{1.10} Si (OC_2H_5)_{0.10}(OH)_{0.03} O_{2.77/2}$$

and 5 parts by weight of a polymer consisting of 70 percent by weight of vinyl acetate and 30 percent by weight of di-n-butyl maleinate having a K-value of 35 in 90 parts by weight of toluene were brush applied at a rate of 480 g/m² to one half of a concrete slab 2A having a raw weight unit of 550 to 700 Kg/m³.

Slab 2B was prepared in the same manner with a solution of 10 parts by weight by the said copolymer in 90 parts by weight of toluene. Slab 2C was prepared in the same manner with a solution of 5 parts by weight of the aforesaid organopolysiloxane in 95 parts by weight of toluene.

24 hours after the application of the said primer coats, the aqueous dispersion paint used in Example I was used to coat the said slabs. Slabs 2A and 2B were coated without difficulty but the paint did not sufficiently wet slab 2C and the top coat had fish eyes due to uneven flow.

The portion of the slabs which were prime coated but not topcoated were broken 24 hours after the application of the prime coat and water was dropped on the fracture surface. The portion of the fracture which were not wetted by the water was the portion impregnated by the prime coat and the depth of penetration for each slab was determined and is reported in Table II.

TABLE II

| Slab | Penetration Depth in mm |
| --- | --- |
| 2A | 1.5 |
| 2B | 0.25 |
| 2C | 2.0 |

Table II shows that the primer coat penetrates the concrete slab so that even if crazes form in the slab, water penetration is eliminated.

EXAMPLE III

A solution of 3 parts by weight of the organopolysiloxane of Example I, 7 parts by weight of a copolymer of 70 percent by weight of vinyl acetate and 30 percent by weight ethylene in 47 parts by weight of Shellsol A (isomeric mixture of trimethylbenzenes), 23 parts by weight of toluene and 20 parts by weight of diacetone alcohol was brush-applied at a rate of 500 g/m² to a concrete slab 3A with a raw weight unit of 550 to 770 kg/m³. Slab 3B was prepared in the same manner using a 10 percent by weight aqueous dispersion of unpigmented polyvinylpropionate.

5 hours after the application of the primer coats, slabs 3A and 3B were twice coated with an aqueous dispersion paint having a pigment volume of about 46.5 percent and consisting of an admixture of 183 parts by weight of water, 15 parts by weight of a 10 percent aqueous solution of sodium hexametaphosphate, 180 parts by weight of rutile, 200 parts by weight of powdered dolomite, 20 parts by weight of talc, 2 parts by weight of tributyl phosphate, 15.3 parts by weight of a 10 percent solution of p-chloro-m-cresol in toluene, 20 parts by weight of ethylene-glycol, 35 parts by weight of a 3 percent by weight aqueous solution of hydroxyethylcellulose, 320 parts by weight of a 50 percent by weight aqueous dispersion of polyvinylpropionate and 0.3 parts by weight of concentrated ammonium hydroxide. The coated plates were then placed on a weathering roof at a 45° angle facing west. After 16 months of weathering, about 10 percent of the topcoat surface of slab 3B had scaled off but the surface of slab 3A was unchanged.

EXAMPLE IV

A slab was prepared from 500 parts by weight of water and 700 parts by weight of gypsum and was coated at a rate of 500 g/m² with a solution of 6 parts by weight of the organopolysiloxane of Example I and 4 parts by weight of an epoxy resin formed from diphenylolpropane and epichlorohydrin having an epoxy value of 0.19 to 0.22 and a hydroxyl value of 0.32 in 90 parts by weight of toluene to form slab 4A. Slab 4B was prepared in a similar manner using a solution of 10 parts by weight of polyvinylacetate having a K-value of 40 in 80 parts by weight of toluene and 10 parts by weight of isopropyl alcohol.

24 hours after the primer coating, slabs 4A and 4C and slab 4C (unprimed gypsum slate) were brush-coated with a commercial aqueous dispersion paint consisting of an admixture of 168 parts by weight of water, 15 parts by weight of a 10 percent aqueous solution of sodium hexametaphosphate, 25 parts by weight of a 10 percent by weight aqueous paste of Hectorite which is a mineral of the formula $Mg_{2.67}Li_{0.33}(OH)_2 Si_4O_{10}$, 180 parts of rutile, 200 parts by weight of powdered dolomite, 20 parts by weight of talc, 2 parts by weight of tributyl-phosphate, 15.3 parts by weight of 10 percent by weight solution of p-chloro-m-creosol in toluene, 20 parts by weight of ethyleneglycol, 35 parts by weight of a 3 percent by weight aqueous solution of methylcellulose, 320 parts by weight of a 50 percent by weight aqueous dispersion of a mixture of dibutylphthalate and a copolymer of 50 percent by weight of vinyl acetate, 20 percent by weight of vinyl chloride and 30 percent by weight of vinyl laurate in a weight ratio of 6:44 and 0.3 kg of concentrated ammonium hydroxide.

The adherence effect caused by priming the gypsum before applying the top coat was determined three days after application of the top coat by making therein a lattice of cuts 3 mm deep and 0.5mm wide and spaced 5 mm apart. A pressure sensitive adhesive tape was then pressed on to a portion of the coating and then peeled off. Removal of the adhesive tape from slabs 4A and 4B tore off about 3 mm thick layers of gypsum while the coating was easily removed from slab 4C without harming the gypsum. To test the water repellent effect of the prime coats, 0.5 cc of water was dropped into the cuts. Slab 4B absorbed the water in 6 seconds while slab 4A had not absorbed the water after 364 minutes.

EXAMPLE V

Concrete slabs were prepared from 450 gm of Portland cement PZ 275 (D/N 1164, paragraph 1 of Dec. 1958), 450 gm of standard sand I, fine and 900 gm of standard sand II, coarse, having an embedded iron screen and were removed from the forms one day after the preparation thereof and then were stored under water at 20°C for 6 days and then for 21 days at 20°C and a relative humidity of 65 percent. The surface of the slab was then scraped with a steel brush to remove the top cement layer and to the newly exposed surface a solution of 10 percent by weight of the organopolysiloxane of Example I, 2 parts by weight of a polymethacrylate having a freezing temperature or break point of 80°C and 28 parts by weight of the copolymer of vinyl esters of Example I in 38 parts by weight of ethyl acetate, 149.7 parts by weight of Shellsol A, 159.7 parts by weight of diacetone alcohol and 16 parts by weight of toluene was brush applied at a rate of 500 gm/m². The slab was allowed to stand for 48 hours and then received 2 coats of the aqueous dispersion paint of Example 4 to prepare slab 5A. Slab 5B was prepared in the same manner except the prime coat was omitted.

After standing for 5 hours, cracks 0.05 mm wide were made on both slabs with a device usually used for measuring bending stress strength. 0.2 cc of water was then dropped onto each crack and the absorption time of the water by the concrete was determined. For slab 5A, the time was 35 minutes and for slab 5B, the time was 10 seconds.

Water runs off vertical surfaces such as facades before penetrating through cracks in the coating in the case of slab 5A of the invention. This example and Example II clearly demonstrate that the primary compositions of the invention prevent water absorption even if cracks occur therein.

Various modifications of the compositions and method of the invention may be made without departing from the spirit or scope thereof and it is to be understood that the invention is to be limited only as defined in the appended claims.

We claim:

1. A method of providing building materials with a protective coating against water absorption which comprises applying to building materials a coating of a composition comprising a solution of a mixture of (1) 20 to 99 percent by weight of at least one organic synthetic resin containing carbon and hydrogen and optionally at least one member of the group consisting of oxygen, sulfur, nitrogen and halogen and (2) 1 to 80 percent by weight of an organopolysiloxane having units of the average formula $$R_xSi(OR')_y(OH)_zO_{4-x-y-z/2}$$

wherein R is selected from the group consisting of hydrogen and methyl with at least 50 percent of the total R's being methyl, R' is alkyl of one to four carbon atoms, x, y and z each having a value from 0 to 3 inclusive with the sum of $x+y+z$ being not greater than 3, with the average value of x being 0.9 to 1.7 and the average value of z and y being 0.00 to 0.10 and at least one of z and y being greater than 0.00 in an organic solvent at a rate of 30 to 70 gm of organopolysiloxane and organic synthetic resin per square meter of surface, drying the said coating, applying to the said coated building materials a final coat of an aqueous polymer dispersion and drying the said final coating.

2. The method of claim 1 wherein the synthetic resin is a vinyl resin.

3. The method of claim 1 containing 50 to 90 percent by weight of the organic synthetic resin and 10 to 50 percent by weight of the organopolysiloxane.

4. The method of claim 1 wherein the mixture of resin and organopolysiloxane are 5 to 30 percent by weight of the total composition.

5. The method of claim 1 wherein R' is ethyl.

6. The method of claim 1 wherein the organic solvent is a mixture of solvents and one of the solvents is water-miscible.

7. The method of claim 1 wherein x is 1.0 to 1.2.

8. The method of claim 1 wherein the organopolysiloxane contains not more than 30 mole percent of siloxane units with more than one Si-CH$_3$ group and has a viscosity of not more than 100 cst/25°C in a 50 percent by weight toluene solution.

9. A method of providing building materials with a protective coating against water absorption comprising applying to building materials a coating of a composition comprising a solution of a mixture of (1) 50 to 90 percent by weight of an organic synthetic resin selected from vinyl resins, acrylic resins, vinylidene resins, alkyd resins, epoxy resins, polyester resins, polyether resins or poly-amide resins and (2) 10 to 50 percent by weight of an organo poly-siloxane having units of the average formula $$R_xSi(OR')_y(OH)_zO_{4-x-y-z/2}$$

wherein R is selected from the group consisting of hydrogen and methyl with at least 50 percent of the total Rs being methyl, R' is alkyl of one to four carbon atoms, x, y and z each having a value from 0 to 3 inclusive with the sum of $x+y+z$ being not greater than 3, with the average value of x being 0.9 to 1.7 and the average value of z and y being 0.00 to 0.10 and at least one of z and y being greater than 0.00 in an organic solvent at a rate of 30 to 70 gm of organopolysiloxane resin and synthetic resin per square meter of surface, drying the said coating, applying to the said coated building material a final coat of an aqueous dispersion of a polymer of a monomer selected from vinyl acetate, vinyl propionate, methylacrylate, ethyl acrylate or vinyl chloride, copolymers of at least two of said monomers, copolymers of said monomers with di-n-butyl maleinate or di-n-butyl fumarate, copolymers of butadiene-styrene or butadiene-styrene-acrylic acid and drying the said final coating.

* * * * *